United States Patent
Shenk et al.

(10) Patent No.: US 12,025,189 B1
(45) Date of Patent: Jul. 2, 2024

(54) IN-LINE COMPACT BALER DECLUTCH MECHANISM

(71) Applicant: CNH Industrial America LLC, New Holland, PA (US)

(72) Inventors: Jonathan Shenk, Lititz, PA (US); Devin Cooley, Reading, PA (US); William D. Hotaling, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/106,718

(22) Filed: Feb. 7, 2023

(51) Int. Cl.
*F16D 23/12* (2006.01)
*A01F 15/08* (2006.01)
*F16D 11/14* (2006.01)
*F16D 25/061* (2006.01)

(52) U.S. Cl.
CPC ........ *F16D 25/061* (2013.01); *A01F 15/0841* (2013.01); *F16D 11/14* (2013.01); *F16D 23/12* (2013.01); *F16D 2023/123* (2013.01)

(58) Field of Classification Search
CPC .. A01F 15/085; A01F 15/0858; F16D 25/088; F16D 2023/123
See application file for complete search history.

(56) References Cited

U.S. PATENT DOCUMENTS

| | | | |
|---|---|---|---|
| 3,106,998 A * | 10/1963 | Walker | A01C 19/045 192/93 A |
| 3,951,288 A * | 4/1976 | Hale | A01D 90/083 414/491 |
| 4,242,857 A | 1/1981 | Parrish et al. | |
| 4,425,753 A | 1/1984 | Freimuth | |
| 5,813,204 A | 9/1998 | Pecenka et al. | |
| 5,896,966 A * | 4/1999 | Schmelzle | F16D 25/088 192/85.48 |
| 6,272,825 B1 | 8/2001 | Anderson et al. | |
| 8,311,709 B2 | 11/2012 | Vanhercke et al. | |
| 8,794,411 B2 * | 8/2014 | Lee | F16D 41/14 192/43 |
| 2010/0077716 A1 | 4/2010 | Sonne | |
| 2011/0073431 A1 * | 3/2011 | Chludek | F16D 23/12 192/66.1 |
| 2019/0116735 A1 * | 4/2019 | Lang | B65B 13/26 |
| 2019/0133046 A1 * | 5/2019 | Standaert | A01F 15/0841 |

(Continued)

*Primary Examiner* — Stacey A Fluhart
(74) *Attorney, Agent, or Firm* — Peter K. Zacharias; Rebecca L. Henkel; Rickard K. DeMille (57) ABSTRACT

An agricultural baler comprising: a frame; wheels; a gearbox; baler drive components configured to process crop material into bales; and a declutch mechanism. The declutch mechanism includes: an input shaft and an output shaft that both extend along a drive axis that is perpendicular to the baler's travel direction, with the input shaft connected to the gearbox and the output shaft connected to the drive components; a drive coupling positioned along the drive axis between the opposite ends of the input shaft and output shaft end, and an activation coupling assembly. The drive coupling is reconfigurable, by the activation coupling assembly, between an engaged position in which the drive coupling connects the output shaft to rotate with the input shaft about the drive axis, and a disengaged position in which the drive coupling does not connect the output shaft to rotate with the input shaft about the drive axis.

20 Claims, 6 Drawing Sheets

(56) References Cited

U.S. PATENT DOCUMENTS

| | | |
|---|---|---|
| 2021/0127580 A1 | 5/2021 | Singh et al. |
| 2021/0127581 A1 | 5/2021 | McClure |
| 2022/0192098 A1 | 6/2022 | Smith et al. |

\* cited by examiner

IN-LINE COMPACT BALER DECLUTCH MECHANISM

FIELD OF THE INVENTION

The present invention relates to agricultural vehicle operating systems, and particularly drive systems for machinery such as balers, in which it is desirable to periodically disengage mechanical drive to working components.

BACKGROUND OF THE INVENTION

Agricultural balers are a class of equipment used to consolidate and package crop material for storage and handling of the same. The crop material can have various forms. For example, in the case of hay, a mower-conditioner is typically used to cut and condition the crop material for windrow drying in the sun. In the case of straw, an agricultural combine discharges non-grain crop material from the rear of the combine as straw (such as wheat or oat straw) which is to be picked up by the baler. After the crop material has sufficiently dried, a baler, which is typically towed by an agricultural vehicle, picks up the crop material and forms it into round or square bales.

A baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, form the crop material into a bale within the chamber. The baler wrapping mechanism then wraps or ties the baler to hold it in shape, using twine, netting, plastic sheet, and so on, and the bale is ejected out of the rear of the baler. In some cases, the baler may have a tailgate that opens to allow the bale to be discharged onto the field.

The mechanisms of a baler may be powered by a mechanical power take-off shaft (PTO), hydraulic motors and actuators, and other mechanisms. For example, in a towed bailer, the pickup unit, cutting unit and bailing and wrapping mechanism may be powered by a PTO shaft that is driven by the tractor's main engine, while other mechanisms, such as the tailgate door, may be operated by hydraulic lines that connect to the tractor's hydraulic pump. In some cases, a clutch may be provided to disengage certain operating parts at certain times during operation. For example, it is known to use a clutch to disconnect components such as the pickup unit and the baling and wrapping mechanism, while the tailgate is opened and the bail is ejected.

Examples of known balers and their operations are described in United States Publication Nos. 2021/0127580, 2021/0127581 and 2022/0192098, and U.S. Pat. No. 6,272,825, which are incorporated herein by reference.

One problem with known balers is that the binding or net wrap can be damaged or "scuffed" during the ejection of the bale in certain crops and conditions. In some cases, a simple clutch has been used to stop the baler belts from turning, which helps reduce the incidence of scuffing by slowing or stopping the bale rotation as it is ejected. While helpful, balers having such mechanisms still can experience an undesirably high incidence of scuffing, and such mechanisms can have reliability and service issues.

SUMMARY OF THE INVENTION

According to one aspect of the invention, there is provided an agricultural baler comprising: a frame; one or more wheels attached to the frame and configured to guide the frame along a travel direction; a gearbox attached to the frame; one or more baler drive components configured to process crop material into bales; and a baler declutch mechanism attached to the frame and comprising: an input shaft extending along a drive axis from a first input shaft end to second input shaft end, wherein the input shaft end is configured to connect to and be driven by the gearbox and the drive axis is perpendicular to the travel direction, an output shaft extending along the drive axis from a first output shaft end to a second output shaft end, wherein the second output shaft end is operatively connected to the one or more baler drive components, a drive coupling positioned along the drive axis between the first input shaft end and the second output shaft end and reconfigurable between an engaged position in which the drive coupling connects the output shaft to rotate in unison with the input shaft about the drive axis, and a disengaged position in which the drive coupling does not connect the output shaft to rotate in unison with the input shaft about the drive axis, and an activation coupling assembly configured to move the drive coupling between the engaged position to the disengaged position.

According to another aspect, there is provided a baler declutch mechanism comprising: an input shaft extending in a distal direction along a drive axis from a first input shaft end to second input shaft end; a first drive coupling connected to the input shaft at the second input shaft end, and configured to rotate in unison with the input shaft about the drive axis, the first drive coupling comprising a first drive coupling face oriented in the distal direction; an output shaft extending in the distal direction along the drive axis from a first output shaft end to a second output shaft end, wherein the output shaft is collinear with the input shaft; a second drive coupling connected to the output shaft at the first output shaft end, and configured to rotate in unison with the output shaft about the drive axis, the second drive coupling comprising a second drive coupling face oriented in a proximal direction opposite the distal direction, wherein the second drive coupling is movable along the drive axis between an engaged position in which the second drive coupling face engages the first drive coupling face to cause the second drive coupling to rotate in unison with the first drive coupling about the drive axis, and a disengaged position in which the second drive coupling face is spaced along the drive axis from the first drive coupling face such that the second drive coupling is not caused to rotate in unison with the first drive coupling about the drive axis; a first activation coupling located at a fixed first distance along the drive axis from the first drive coupling, with the second drive coupling located between the first drive coupling and the first activation coupling; a second activation coupling connected to the second drive coupling and spaced along the drive axis from the second drive coupling, with the first activation coupling located between the second drive coupling and the second activation coupling; and an actuator configured to generate a disengagement force along the drive axis to move the second activation coupling along the drive axis away from the first activation coupling, to thereby move the second drive coupling from the engaged position to the disengaged position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

The figures depict the elements in schematic form and are not necessarily to scale.

DETAILED DESCRIPTION

Corresponding reference characters indicate corresponding parts throughout the several views. The embodiments described herein are only examples, and are not to be construed as limiting the scope of the invention in any manner.

Inasmuch as various components and features of balers are of well-known design, construction, and operation to those skilled in the art, the details of such components and their operations will not generally be discussed in significant detail unless considered of pertinence to the present invention or desirable for purposes of better understanding.

Figure 1:
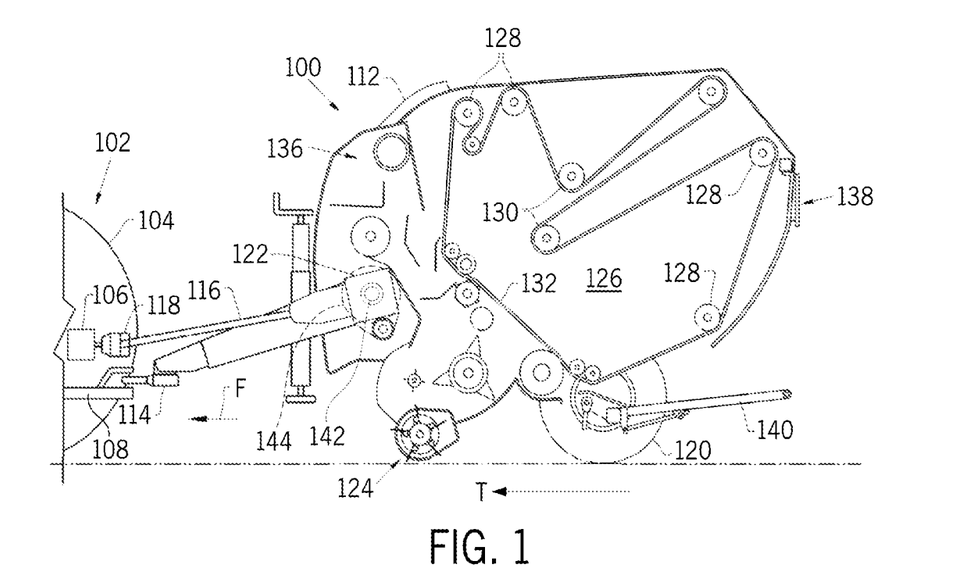
FIG. 1 illustrates a schematic side view of an exemplary baler for use with embodiments described herein.

Referring now to FIG. 1, an exemplary baler 100 is shown attached to an agricultural vehicle 102 in a towed configuration. The agricultural vehicle 102 generally includes a chassis, a prime mover, wheels 104 and/or tracks, a tractor power-take-off (PTO) unit 106, and a hitch 108. The agricultural vehicle 102 may be manually operated, autonomous or semi-autonomous, and may comprise any suitable type of tractor or other mobile machine. The baler 100 also may be integrated into an agricultural vehicle, rather than being a towed device.

The baler 110 generally includes a frame 112, a hitch 114 pivotally connected to the agricultural vehicle 102, a baler PTO shaft 116, a flexible joint 118 (e.g., a universal joint or constant velocity joint) joining the baler PTO shaft 116 to the PTO unit 106, and wheels 120 that support the baler 100 to move in a travel direction T. The baler PTO shaft 116 is connected to and driven by the PTO 106 of the agricultural vehicle 102. The baler PTO shaft 116 drives a gearbox 122 which in turn powers various operational systems of the baler 110. The baler 110 can also be connected to the agricultural vehicle 102 by way of an electrical communication connection, hydraulic lines, and so on.

The baler 100 has a pickup unit 124 and a bale chamber 126. The pickup unit 124 lifts crop material from the ground as the baler 100 is towed behind the agricultural vehicle 102, and directs the crop material to the bale chamber 126. The bale chamber 126 has multiple rolls or rollers 128, 130, such as various stationary rollers 128 and movable rollers 130, and at least one belt 132. One or more cylinders and/or pivot arms (not shown) are coupled to the movable rollers 130, so as to allow the bale chamber 126 to expand in size to accommodate the expanding bale. The rollers 128, 130 and belt(s) 132 are configured to engage and roll the crop material to form the bale.

When the bale reaches a predetermined size, a wrapping mechanism 136 secures the bale in its final shape with a wrapping material (e.g., mesh or twine). Thereafter, a tailgate 138 opens which allows the wrapped bale to be discharged out of the bale chamber 126 and onto a bale ejector, such as a kicker or ramp 140. The ramp 140 may move the bale rearwardly and deposit the bale onto the field or onto a bale holding device, thus providing sufficient clearance for the tailgate 138 to close unencumbered by the bale.

As noted above, the gearbox 122 transfers mechanical power from the PTO shaft 116 to various working parts within the baler 100. To this end, the gearbox 122 has a mechanical drive output in the form of a jackshaft 142 or the like. The jackshaft 142 transfers drive from the gearbox 122 to one or more pulleys, sprockets, gears, or the like, which in turn are operatively connected to mechanisms that drive the baler belt(s) 132 and/or other devices. As used herein, operatively connected means connected (permanently or selectively) to transfer power, motion, fluid, or electricity (depending on the context), either by direct connection or by intervening parts. Such driveline connections are generally known in the art, and need not be described herein.

At certain times, it is beneficial to stop the mechanisms being driven by the gearbox 122. For example, it may be desirable to stop the belt(s) 132 as the wrapped bale is being ejected, so as to avoid damage to the bale wrapping.

FIGS. 2-8 illustrate an embodiment of a declutching mechanism 144 (referred to herein simply as a "clutch") that may be used to disconnect power transmission from the gearbox 122 to one or more baler mechanisms.

Figure 2:
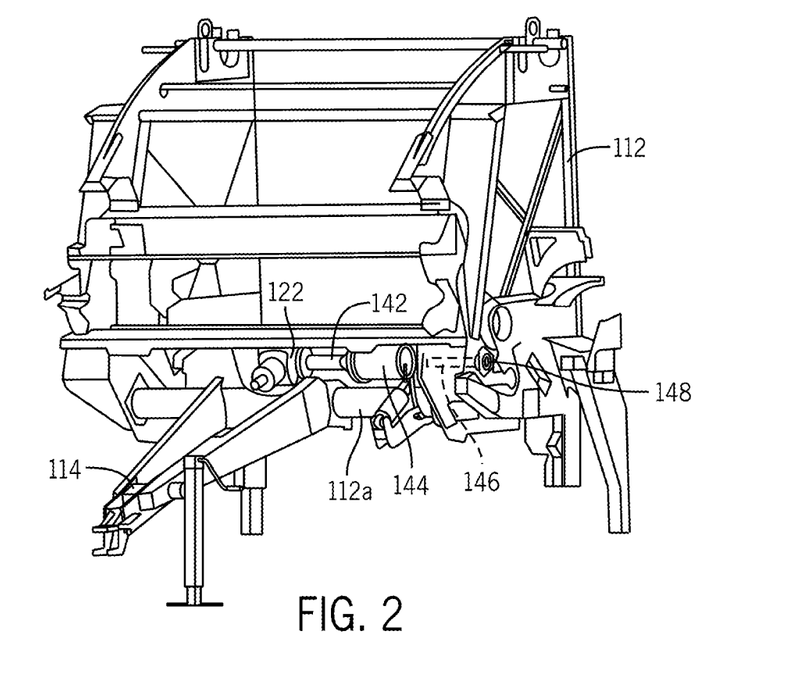
FIG. 2 illustrates a perspective view of an exemplary baler of FIG. 1, shown with various parts removed.

FIG. 2 shows an exemplary baler 100 stripped down to the frame 112. The frame 122 comprises a generally rigid structure to which the hitch 114 is secured via a cross tube 112a or a similar structure. The gearbox 122 is secured to the frame 112 at a location where it can receive the PTO shaft 116, which in this case is at the top of the cross tube 112a where it joins the hitch 114. The jackshaft 142 extends from the gearbox 122 to the exemplary clutch 144, which is described in more detail below. The clutch 144 has an output shaft 146, which is connected to an output drive plate 148. The output drive plate 148 is secured to the transmission that drives the operating components of the baler 100, such as the belt(s) 132. The clutch 144 is also secured to the frame 112 at one or more fixed locations, such as the cross tube 112a.

Figure 3:
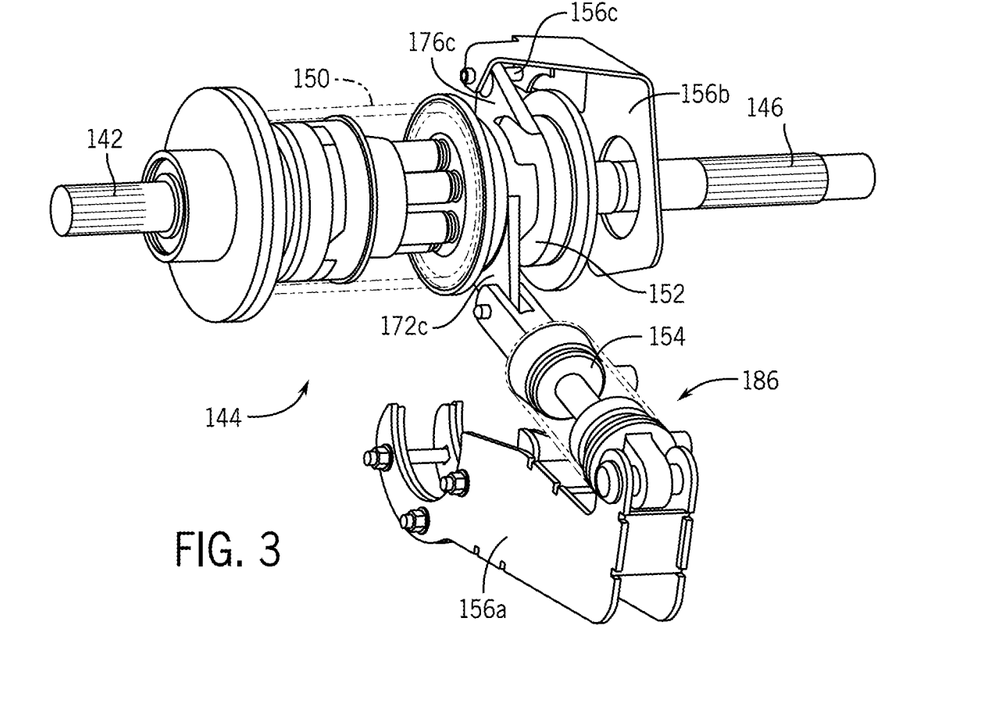
FIG. 3 is an isometric view of an exemplary clutch.

FIG. 3 is a perspective view showing an exemplary clutch 144 in greater detail. The clutch 144 generally includes an input shaft 142 (which, in this case, is the jackshaft 142), a clutch body 150, an activation coupling assembly 152, an output shaft 146, an actuator 154, and a base 156. The clutch body 150 and actuator 154 are shown partially transparent to view internal parts. The base 156, which secures the activation coupling assembly 152 to the frame, is shown as two separate brackets 156a, 156b that join the clutch 144 to the frame 112 at different locations.

In one preferred embodiment, the entire clutch 144 may be configured and dimensioned to replace a conventional jackshaft or driveshaft in an existing baler 100. For example, as shown in FIGS. 1 and 2, the baler 100 may be supported by the wheels 120 to move in a travel direction T, and the clutch 144 is configured to replace a conventional jackshaft (not shown) that would normally be connected between the gearbox 122 and the drive output plate 148 to thereby connect to the baler drive components (e.g., pickup unit 124, belts 132, etc.). In this case, the clutch 144 rotation axis is perpendicular to the travel direction, and parallel to the rotation directions of the operative parts, to thereby minimize the need to redirect the rotational drive axis in different directions (e.g., the gearbox 122 may be the only part via which the rotation axis is changed throughout the system). As another example, the clutch 144 may be mounted on the hitch portion of the frame 112 and configured to replace all or a portion of the PTO drive shaft 116. Other alternatives and embodiments will be apparent to persons of ordinary skill in the art in view of the present disclosure.

Figure 4:
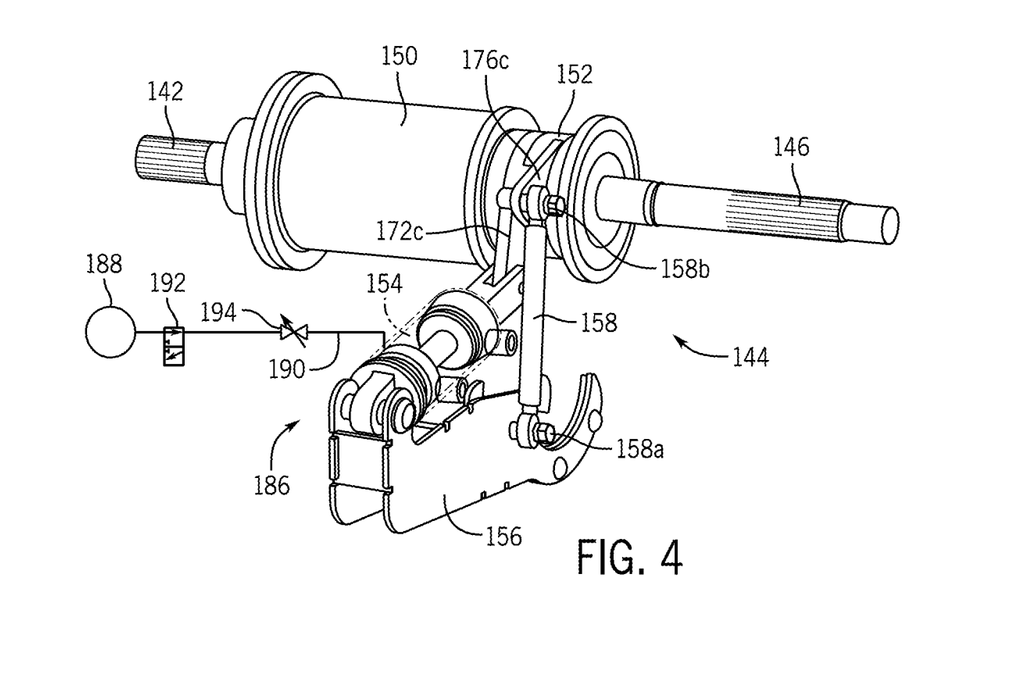
FIG. 4 is an isometric view of another exemplary clutch.

FIG. 4 shows an alternative perspective view of an exemplary clutch 144, which is generally the same as the clutch 144 of FIG. 3. In this case, however, the base 156 comprises a single bracket that joins the activation coupling assembly 152 to the frame 112. The base 156 also includes a connecting rod 158, the purpose of which is described in more detail below. The base 156 may be secured to the frame 112 using any suitable fasteners or other connection (e.g. integral forming or using a pre-existing part of the frame 112, welding, etc.).

Figure 5A:
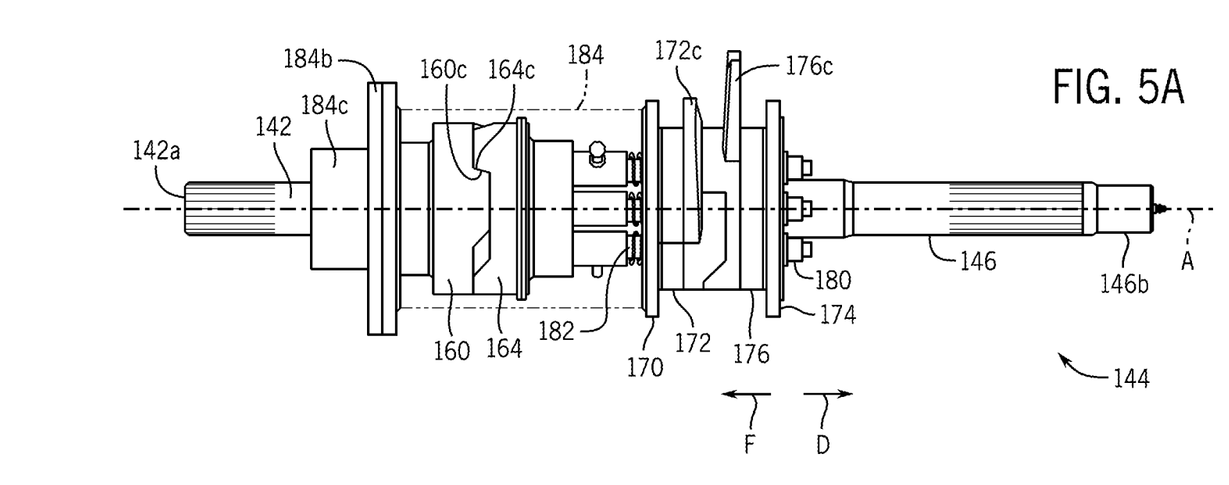
FIGS. 5A and 5B are side views of an exemplary clutch shown in the engaged and disengaged positions, respectively.
Figure 5B:
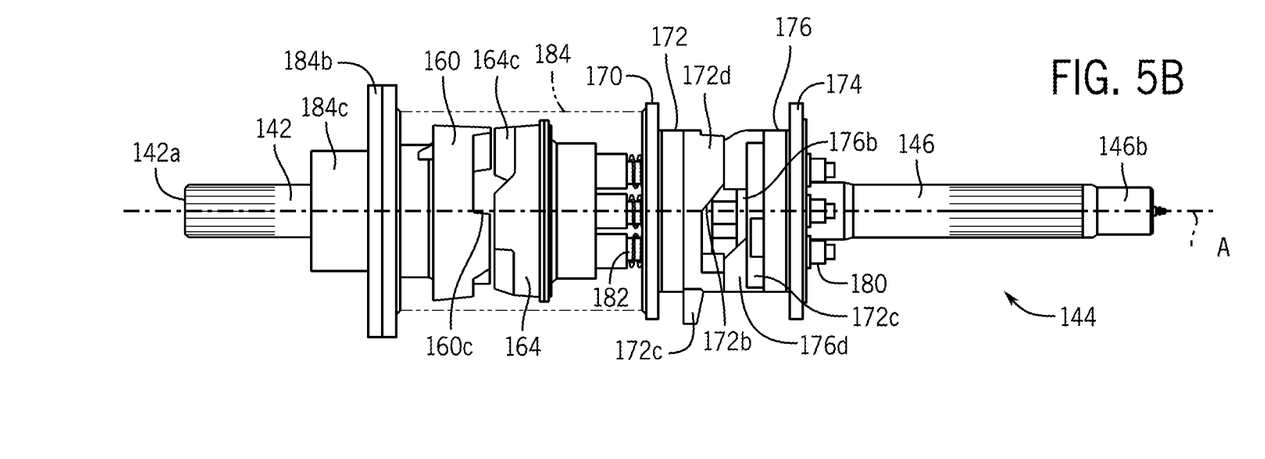
Figure 6:
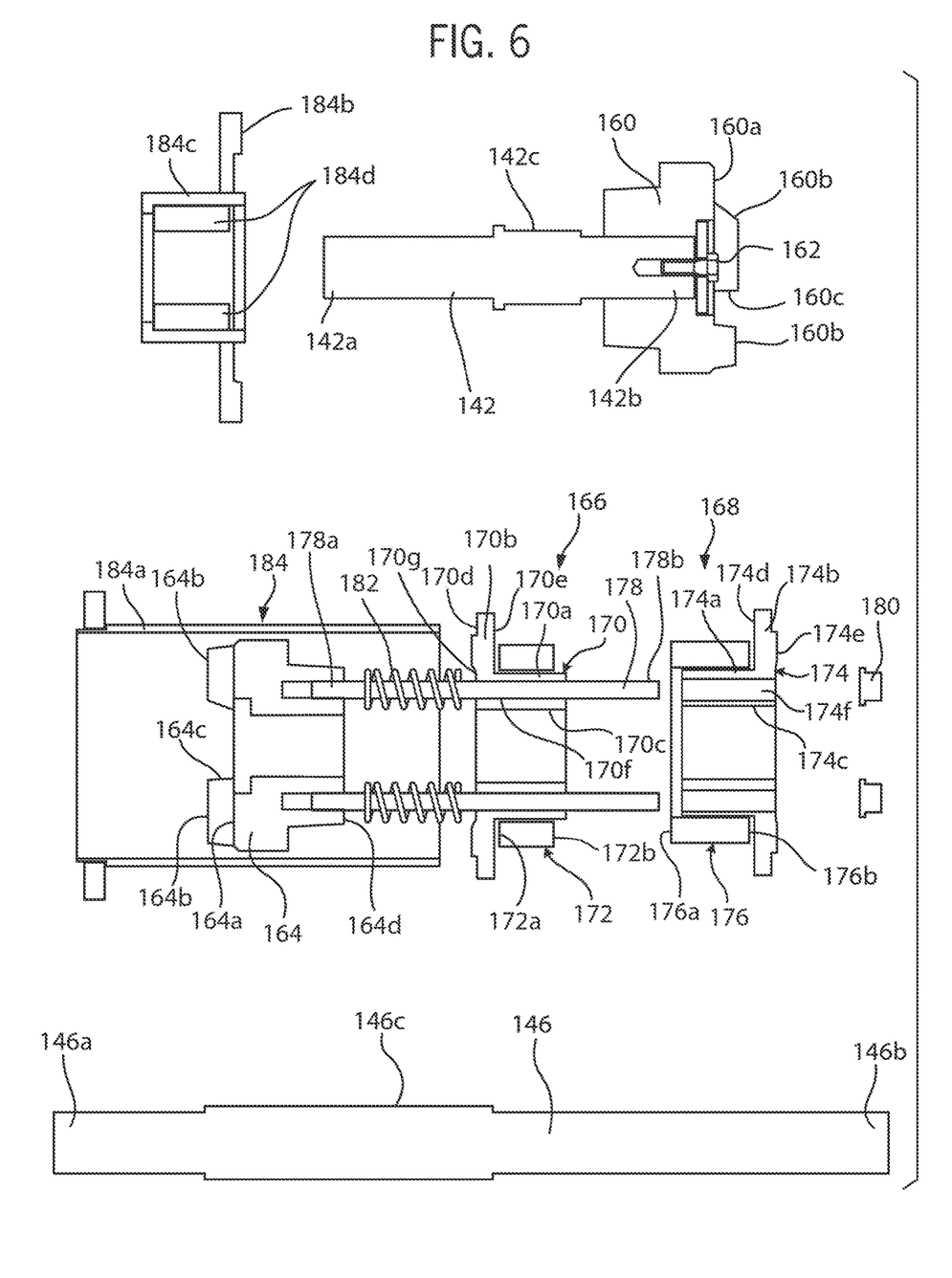
FIG. 6 is an exploded cross-section view of the clutch of FIGS. 5A and 5B.
Figure 7:
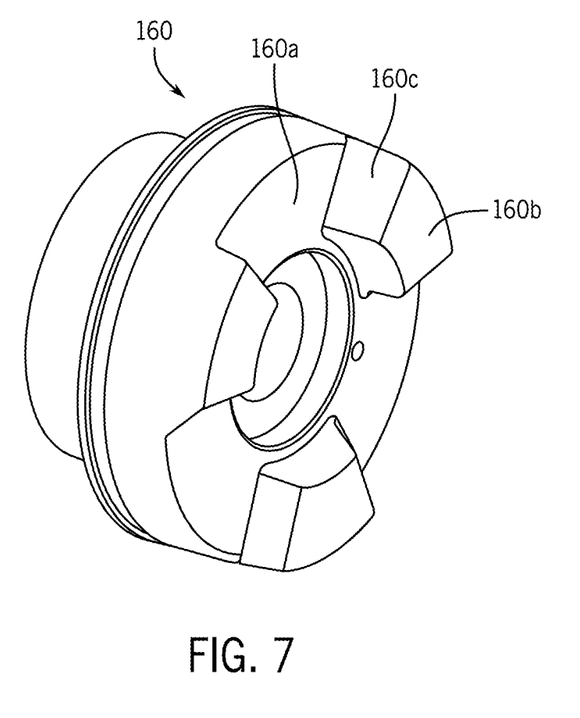
FIG. 7 is a perspective view of an exemplary drive coupling.

FIG. 5A shows the clutch 144 in the engaged position, and FIG. 5B shows the clutch in the disengaged position. Portions of the clutch body 150 are shown in a semi-transparent state in FIGS. 5A and 5B so as to illustrate the internal parts. FIG. 6 is a cross-sectional exploded illustration of the clutch 144.

The clutch 144 extends along a drive axis A about which the input shaft 142 is driven by the gearbox 122 (or by any other suitable mechanism) to rotate. The drive axis A extends in a proximal direction P and a distal direction D that is opposite to the proximal direction P.

The input shaft 142 extends in the distal direction D along the drive axis A from a first input shaft end 142a to second input shaft end 142b. Similarly, the output shaft 146 extends in the distal direction D parallel to the drive axis A from a first output shaft end 146a to a second output shaft end 146b. The output shaft 146 preferably is parallel and collinear with the input shaft 142, but this is not strictly necessary (e.g., some or all of the output shaft 146 may be offset from the input shaft 142 by an intermediate gear or other drive assembly). The input shaft 142 and output shaft 146 each may include features such as splines or keyways to transmit rotational torque, grease passages and fittings for service, and so on. Other alternatives and embodiments will be apparent to persons of ordinary skill in the art in view of the present disclosure.

A first drive coupling 160 is connected to the input shaft 142 at the second input shaft end 142b. The first drive coupling 160 is rotationally fixed to the input shaft 142 (i.e., secured to rotate in unison with the input shaft 142). For example, the first drive coupling 160 may be provided as a separate part (e.g., a cast metal part) that is rotationally fixed to the input shaft 142 by interlocking splines, one or more keys or pins, or the like. The first drive coupling 160 also may be axially fixed to the input shaft 142 (i.e., secured to move in unison with the input shaft 142 along the drive axis A). For example, the first drive coupling 160 may be held to the second input shaft end 142b by a fastener 162. In other embodiments, the first drive coupling may be integrally formed with the input shaft 142 (e.g., by forging, casting, permanently welding the parts together, etc.).

A second drive coupling 164 is rotationally fixed to the output shaft 146 at the first output shaft end 146a, such as by being attached via interlocking splines. The second drive coupling 164 may be axially fixed to the output shaft 146, but more preferably is not axially fixed to the output shaft 146, such that the second drive coupling 164 is free to move along the drive axis A relative to the output shaft 146 (e.g., slide along splines), at least through some limited range of travel.

The first drive coupling 160 has a first drive coupling face 160a that is oriented in the distal direction D, and the second drive coupling 164 has a second drive coupling face 164a that is oriented in the proximal direction P. An example of a drive coupling face 160a is shown in perspective view in FIG. 7. The drive coupling faces 160a, 164a may be identical, mirror images, or otherwise have essentially the same shapes, but this is not strictly required.

The second drive coupling 164 is movable along the drive axis A relative to the first drive coupling 160, between an engaged position in which the second drive coupling face 164a contacts the first drive coupling face 160a (see, e.g., FIG. 5A), and a disengaged position in which the second drive coupling face 164a does not contact the first drive coupling face 160a (see, e.g., FIG. 5B). In the engaged position, the first drive coupling face 160a and second drive coupling face 164a interact to transmit a drive torque applied to the first drive coupling 160 to the second drive coupling 164, and thereby cause the second drive coupling 164 to rotate in unison with the first drive coupling 160 about the drive axis A. For example, the first drive coupling face 160a may have one or more first drive protrusions 160b extending in the distal direction D towards the second drive coupling 164, and the second drive coupling face 160a may have one or more second drive protrusions 164b extending in the proximal direction P towards the first drive coupling 160. The first drive protrusions 160b and second drive protrusions 164b are shaped such that they intermesh when the second drive coupling 160 is in the engaged position, to thereby transmit torque between them and rotate in unison about the drive axis A. When the second drive coupling 164 is in the disengaged position, the first drive protrusions 160b and second drive protrusions 164b are spaced from each other along the drive axis A, and thus cannot transmit torque to cause the second drive coupling 164 to rotate in unison with the first drive coupling 160.

In the shown example, there are three first drive protrusions 160b, and three second drive protrusions 164b. As shown in FIG. 5A, the first and second drive protrusions 160b, 164b are dimensioned to fit between each other to allow the first drive coupling 160 and second drive coupling 164 to move close together. Each drive protrusion 160b, 160b has one or more drive faces 160c, 164c, and these drive faces 160c, 164c. In the engaged position, the first and second drive protrusions 160b, 164b intersect teach others' rotational path, so that drive faces 160c, 164c contact each other to transmit and react drive torque. The drive faces 106c, 164c may be parallel to the drive axis A, or at some angle relative to the drive axis A, but preferably are not angled so much that the torque loads generate an axial vector for that is sufficient to push the second drive coupling along the drive axis A to the disengaged position.

It will be appreciated from the foregoing that the engaged position of the second drive coupling 164 can encompass a predetermined range of motion of the second drive coupling 164 relative to the first drive coupling 160 along the drive axis A, rather than a single discrete position along the drive axis A. In particular, the second drive coupling 164 is in the engaged position in any position in which it is suitably engaged with the first drive coupling 160 to transmit rotational torque. In the shown example, the engaged position corresponds to any position in which the first drive protrusions 160*b* and second drive protrusions 164*b* intermesh to thereby transmit torque between them and rotate in unison about the drive axis A.

While it is preferred for the first and second drive coupling faces 160*a*, 164*a* to have protrusions that intersect each other along their respective rotational paths, it is also contemplated that one of both of these faces 160*a*, 164*a* may instead be flat, and orthogonal to the drive axis A, in which case drive torque is transmitted purely by friction. Other alternatives and embodiments will be apparent to persons of ordinary skill in the art in view of the present disclosure.

The activation coupling assembly 152 moves the second drive coupling 160 between the engaged position and the disengaged position. The activation coupling assembly 152 generally includes has a first activation coupling 166, a second activation coupling 168, and an actuator 154 as shown in FIGS. 3 and 4. The first and second drive couplings 160, 164 and first and second activation couplings 166, 168 are arranged in-line with each other along the drive axis A, with the second drive coupling 164 located between the first drive coupling 160 and the first activation coupling 166, and the first activation coupling 166 between the second drive coupling 164 and the second activation coupling 168. The drive couplings 160, 164 and activations couplings 166, 168 are all located between the first input shaft end 142*a* and second output shaft end 146*b*.

The exemplary first activation coupling 166 includes a first thrust plate 170, and a first thrust ring 172.

The first thrust plate 170 comprises a generally cylindrical main body 170*a*, with a radially-extending flange 170*b*. The main body 170*a* has a central bore 170*c* that surrounds the output shaft 146, and one or more bearings or bushings (not shown) may be provided between the central bore 170*c* of the main body 170*a* and the output shaft 146. In this case, the central bore 170*c* has a smooth cylindrical wall that fits in sliding engagement on a corresponding bearing surface 146*c* of the output shaft 146. The radial flange 170*b* extends radially-outwardly (relative to the drive axis A) from the main body 170*a*, and includes an outer lip 170*d* and a distally-facing surface 170*e*. The first thrust plate 170 also may include one or more bores 170*f* that provide passageways for one or more connecting rods 178, which are described in more detail below. In this case, the radial flange 170*b* is integrally formed with the main body 170*a*, but other embodiments may use separate parts.

The first thrust ring 172 has a proximal face 172*a* that faces in the proximal direction P, and a distal face 172*b* that faces in the distal direction D. The first thrust ring 172 is supported on a cylindrical outer surface of the main body 170*a* of the first thrust plate 170, such that the first thrust ring 172 is rotationally independent from the first thrust plate 170 (i.e., the first thrust ring 172 does not rotate with the first thrust plate 170 about the drive axis A). For example, the first thrust ring 172 may by supported on the main body 170*a* by bearings or bushings (not shown). The proximal face 172*a* of the first thrust ring 172 is in force-transmitting connection with the distal face 170*e* of the radial flange 170*b* of the first thrust plate 170. For example, the proximal face 172*a* may abut the distal face 170*e* either directly or by a thrust bearing or bushing. The first thrust ring 170 also includes a first activation coupling lever 172*c*, which extends radially away from the drive axis A.

The exemplary second activation coupling 168 includes a second thrust plate 174, and a second thrust ring 176.

The second thrust plate 174 comprises a generally cylindrical main body 174*a*, with a radially-extending flange 174*b*. The main body 174*a* has a central bore 174*c* that surrounds the output shaft 146, and one or more bearings or bushings (not shown) may be provided between the central bore 174*c* of the main body 174*a* and the output shaft 146. In this case, the central bore 174*c* has a smooth cylindrical wall that fits in sliding engagement on a bearing surface 146*c* of the output shaft 146. The radial flange 174*b* extends radially-outwardly (relative to the drive axis A) from the main body 174*a*, and includes a proximally-facing surface 174*d*, and a distally-facing surface 174*e*. The second thrust plate 174 also may include one or more bores 174*f* that provide passageways for the one or more connecting rods 178 that also pass through the first thrust plate 170. In this case, the radial flange 174*b* is integrally formed with the main body 174*a*, but other embodiments may use separate parts.

The second thrust ring 176 has a proximal face 176*a* that faces in the proximal direction P, and a distal face 176*b* that faces in the distal direction D. The second thrust ring 176 is supported on a cylindrical outer surface of the main body 174*a* of the second thrust plate 174, such that the second thrust ring 176 is rotationally independent from the second thrust plate 174 (i.e., the second thrust ring 176 does not rotate with the second thrust plate 174 about the drive axis A). For example, the second thrust ring 176 may by supported on the main body 174*a* by bearings or bushings (not shown). The proximal face 176*a* of the second thrust ring 172 is in force-transmitting connection with the distal face 172*b* of the first thrust ring 172, as explained below. The distal face 176*b* of the second thrust ring 176 is in force-transmitting connection with the proximal face 174*b* of the second thrust plate 174. For example, the distal face 176*b* may abut the proximal face 174*d* either directly or by a thrust bearing or bushing. The second thrust ring 176 also includes a second activation coupling lever 176*c*, which extends radially away from the drive axis A.

The first and second thrust rings 172, 176 are configured to such that they can be moved apart along the drive axis A, and thereby move the second drive coupling to the disengaged position. Such motion may be generated by various means. For example, a wedge can be provided as a separate part, and driven between the first and second thrust ring 172, 176, to generate a spreading force. As another example, the first thrust ring 172 (or some other portion of the clutch assembly) may be held along the drive axis A by a brace mounted on the frame 112, and the second thrust ring 174 may be displaced by an arm (e.g., a fork-like arm, or an arm that terminates at a thrust bearing facing the second thrust ring 174) that is pivotally mounted to the frame 112. As yet another example, one or more actuators (e.g., hydraulic pistons) may be mounted to the frame and configured to extend along the drive axis A to apply a force (e.g., via a thrust bearing) to move the second thrust ring 174 away from the first thrust ring 172. Other alternatives and embodiments will be apparent to persons of ordinary skill in the art in view of the present disclosure. In the shown embodiment, the desired movement is accomplished by rotating the first and second thrust rings 172, 176 relative to one another about the drive axis A. Relative movement about the drive axis A is understood to be within the local frame of reference of the drive axis A, and such relative rotation can be accomplished by any one of: (1) rotating one of the thrust rings 172, 176 about the drive axis A while holding the other still; (2) rotating the thrust rings 172, 176 in opposite directions about the drive axis A; and (3) rotating the thrust rings 172, 176 in the same direction about the drive axis A but with different magnitudes of rotation. In the shown example, the first thrust ring 172 is configured to be rotated about the drive axis A by the actuator 154, while the second thrust ring 176 essentially does not rotate about the drive axis A.

The distal face 172*b* of the first thrust ring 172 and the proximal face 176*a* of the second thrust ring 176 have cooperating shapes that cause the first thrust ring 172 and second thrust ring 176 to spread apart relative to each other along the drive axis A, as the two thrust rings 172, 176 are rotated relative to each other about the drive axis A. As with the relative rotational movement described above, the relative movement along the drive axis refers to the local frame of reference of the drive axis A. Thus, the relative spreading movement along the drive axis A may be accomplished by any one of: (1) moving both thrust rings 172, 176 in opposite directions along the drive axis A; (2) moving one thrust ring 172, 176 along the drive axis A while keeping the other still; and (3) moving both thrust rings 172, 176 in the same direction along the drive axis A but with different magnitudes of movement.

As best shown in FIGS. 5A and 5B, the distal face 172*b* of the first thrust ring 172 includes first protrusions 172*d* that extend in the distal direction D to define a first cam profile, and the proximal face 176*a* of the second thrust ring 176 includes second protrusions 176*d* that extend in the proximal direction to define a second cam profile. Each set of protrusions 172*d*, 176*d* includes respective gaps, into which the protrusions 172*d*, 176*d* of the opposite thrust ring 172, 176 fit. The protrusions 172*d*, 176*d* can have any suitable shape to generate a force to move the first and second thrust rings 172, 176 away from each other along the drive axis A. In this case, each protrusion has a ramp that leads to a flat top ("flat" being orthogonal to the drive axis A). The ramps of each thrust ring 172, 176 are oriented in opposite directions about the drive axis A, so that they slide on each other as the thrust rings 172, 176 are rotated relative to each other about the drive axis A. Thus, the ramps generate a force to move the thrust rings 172, 176 apart. The flats (which are optional) hold the thrust rings 172, 176 in position without requiring a continued application of force to rotate the thrust rings 172, 176 relative to each other.

As shown in FIGS. 5A and 5B, the activation coupling assembly 152 is movable, by relative rotation of the first and second thrust rings 172, 176 about the drive axis A, between a first clutch position (FIG. 5A) and a second clutch position (FIG. 5B). In the first clutch position, the first protrusions 172*d* are positioned within the respective gaps between each adjacent pair of second protrusions 176*d*, and the second protrusions 176*d* are positioned within the respective gaps between each adjacent pair of first protrusions 172*d*. Thus, the first and second thrust rings 172, 176 can move towards each other along the drive axis A. In the second clutch position, the first protrusions 172*d* are aligned along the drive axis A with the second protrusions 176*d*, thus spreading the first and second thrust rings 172, 176 at a greater distance along the drive axis A. As explained below, the first clutch position corresponds to the engaged position of the second drive coupling 164, and the second clutch position corresponds to the disengaged position of the second drive coupling 164.

As noted above, one or more connecting rods 178 pass through the first and second thrust plates 170, 174. Each connecting rod 178 extends from a proximal rod end 178*a* to a distal rod end 178*b*. Each proximal rod end 178*a* is fixedly secured to the second drive coupling 164 to move therewith in all directions (i.e., axially along the drive axis A and rotationally about the drive axis A). Such fixation may be by permanent attachment (e.g., welding), threading the rod into a threaded bore in the second drive coupling 164, and so on. Similarly, each distal rod end 178*b* may be fixedly secured to the second activation coupling 168 (specifically, to the second thrust plate 174), to move therewith in all directions. More preferably, however, each distal rod end 178*b* is configured as a lost motion tensile connector that allows the second drive coupling 164 and the second activation coupling 168 to move towards each other along the drive axis A, but limits their maximum movement apart from each other along the drive axis A to a predetermined distance. To this end, the connecting rods 178 in the shown embodiment extend through the bores 174*f* of the second thrust plate 174, and terminate at rod retainers 180 that are positioned to contact the distal face 174*e* of the second thrust plate 174 when the second thrust plate 174 reaches a predetermined distance from the second drive coupling 164. The rod retainers 180 may comprise threaded nuts (as shown), bolt heads, cross-pins, flanges, or other suitable structures that prevent the second thrust plate 174 from moving in the distal direction D past the rod retainers 180.

With this construction, the second thrust plate 174 is free to move away from the second drive coupling 164 in the distal direction D until the second thrust plate 174 contacts the rod retainers 180. Once contact is made, further movement of the second thrust plate 174 in the distal direction D applies a tensile load to the connecting rods 178 to generate a corresponding motion of the second drive coupling 164 in the distal direction D. Similarly, the connecting rods 178 allow the second thrust plate 174 to move in the proximal direction P towards the second drive coupling 164 without generating a compressive force that pushes the second drive coupling 164 towards the engaged position.

It will be appreciated from the foregoing that the connecting rods 178 may also comprise other types of lost motion tensile connectors, such as chains, cables or collapsible linkages. It will also be appreciated that the shown connecting rods 178 may be reversed, such that they are fixed to the second thrust plate 174, and free to slide through bores in the second drive coupling 164. Other alternatives and embodiments will be apparent to persons of ordinary skill in the art in view of the present disclosure.

As best shown in FIG. 6, one or more springs 182 or other resilient members (e.g., elastomeric blocks, pressurized gas accumulators, etc.) may be provided to bias the second drive coupling 164 towards the engaged position. For example, each connecting rod 178 may be surrounded by a respective coil spring 182, which is positioned between a distal face 164*d* of the second drive coupling 164, and a proximal face 170*g* of the first thrust plate 170. The connecting rods 178, rod retainers 180 and springs 182 are dimensioned such that the springs 182 generate a resilient biasing force to move the second drive coupling 164 away from the first thrust plate 170 and into the engaged position, when the second actuator coupling 168 is in the first actuator position (e.g., as shown in FIG. 5A). This helps ensure that the second drive coupling 164 is fully engaged with the first drive coupling 160 in the engaged position.

The springs 182 help account for the situation in which the first and second drive couplings 160, 164 are not properly aligned to return to the engaged position when the activation coupling assembly 152 is returned to the engaged position. For example, as shown in FIGS. 5B, it can be possible for the first and second drive faces 160c, 164c to align with respective flat faces contacting each other to prevent proper engagement. The springs 182 apply a biasing force to force the drive couplings 160, 164 into engagement as soon as the drive faces 160c, 164c are properly aligned, while the lost motion tensile connectors allow the activation coupling assembly 152 to return to the first position. To this end, the free travel distance of the lost motion tensile connectors—i.e., the distance through which the second drive coupling 164 can move towards the second thrust plate 174—should be greater than the range of motion of the engaged position.

Figure 8:
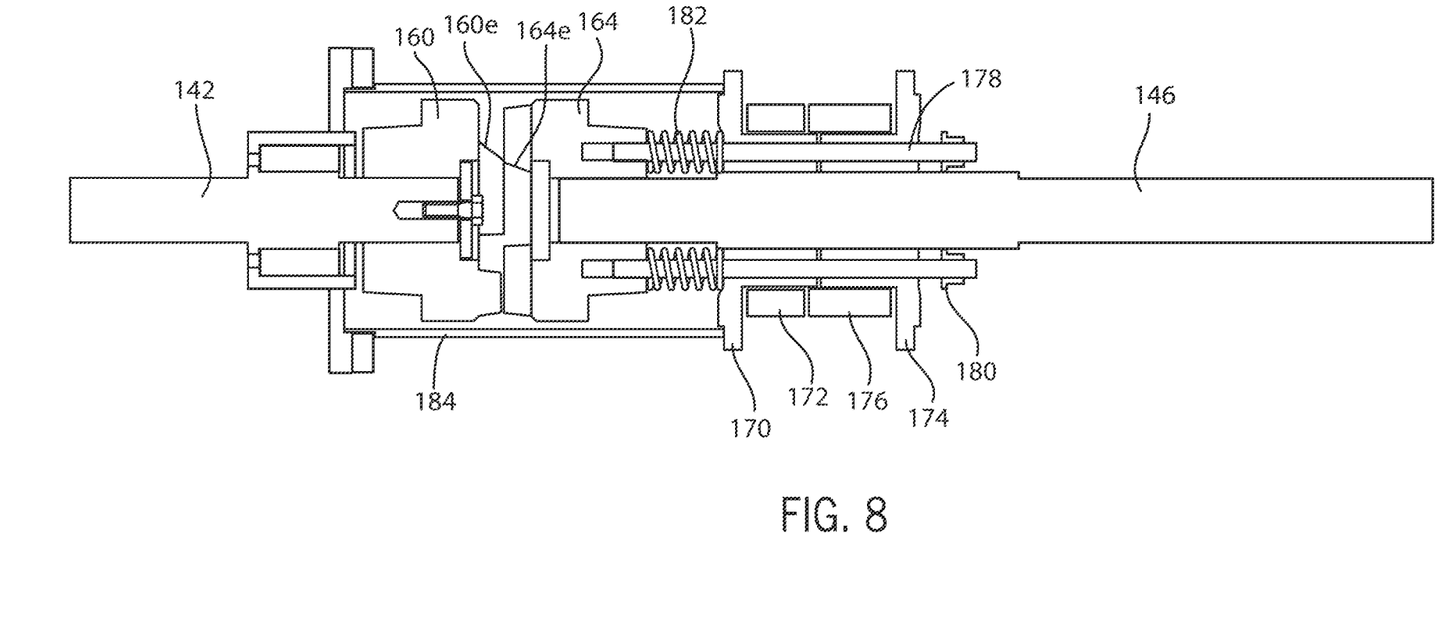
FIG. 8 is a cross-section view the clutch of FIGS. 5A and 5B shown in a particular operating condition.

The springs 182 can also be used to prevent the operating parts of the baler 100 from back-driving the input shaft 142. For example, as shown in FIG. 8, the first and second drive faces 160c, 164c of the first and second drive couplings 160, 164 may have ramped surfaces 160e, 164e that generate a force against the springs 182 to move the second drive coupling 164 to the disengaged position upon experiencing a reversing torque. The lost motion tensile connections help ensure free motion of the second drive coupling 164 independently of the second activation coupling.

The clutch 144 also may include housings, covers, or other structures that enclose and/or connect various operating parts. In the shown example, a clutch housing 184 is provided to hold the input shaft 142 and output shaft 146 in collinear and parallel alignment along the drive axis A, and also to protect the first and second drive couplings 160, 164 and springs 182. As shown in FIG. 6, the clutch housing 184 includes a main body 184a that extends along the drive axis A and surrounds the drive couplings 160, 164 and springs 182, and an end plate 184b that extends radially towards the drive axis A from the proximal end of the main body 184a. The end plate 184b ends at a bearing housing 184c, in which a bearing 184d is contained. The bearing 184d is rotationally supported on a corresponding bearing surface 142c of the input shaft 142. The bearing housing 184c and bearing 184d are located on the proximal side of the first drive coupling 160. The clutch housing 184 and first drive coupling 160 may be fixed relative to each other along the drive axis A, which can be favorable to ensure that the clutch housing 184 does not move into interference with the gearbox 122 or other parts.

At its distal end, the main body 184a of the clutch housing 184 joins the outer lip 170d of the first thrust plate 170 to form an enclosure. The clutch housing 184 and first thrust plate 170 may be firmly connected (e.g., by welding, fasteners, machining as an integral part, etc.) to maximize the ability of the assembly to resist bending loads. With this construction, the clutch housing 184 and first thrust plate 170 can form a rigid beam-like structure that connects the bearing surface 142c of the input shaft 142 to the bearing surface 146c of the output shaft 146. Thus, the clutch housing 184 can hold the input shaft 142 and output shaft 146 in collinear parallel alignment along the drive axis A, without requiring a center bearing or other structure to hold the assembly other than at the first input shaft end 142a and the second output shaft end 146b.

With the foregoing construction, the clutch housing 184 is supported on the input shaft 142 by a rotatable coupling (bearing 184d) and on the output shaft 146 by a non-rotatable coupling. The non-rotatable coupling is formed by the main body 184a being secured to the first thrust plate 170, the rods 178 being located in axial bores 170f in the first thrust plate 170, the rods 178 being fixed to the second drive coupling 164, and the second drive coupling being rotationally fixed (e.g., by splines) to the output shaft 146. Thus, the clutch housing 184 rotates in unison with the output shaft 146 at all times, and is not caused to rotate in unison with the input shaft 142 when the second drive coupling 164 is in the disengaged position.

The actuator 154 in the shown examples comprises a hydraulic piston and cylinder assembly that is interposed between the base 156 and the activation coupling assembly 152. The actuator 154 is operated by extending and retracting the piston relative to the cylinder in a telescoping manner, as known in the art. The actuator 154 connects to one of the first and second activation coupling levers 172c, 176c, while the other lever 172c, 176c is connected to the frame 112 via a fixed bracket (e.g., FIG. 3), a linkage (e.g., FIG. 4), or the like. Extending and retracting the actuator 154 applies a force to the lever 172c or 176c to thereby rotate the respective activation ring 172, 176 about the rotation axis A, and thereby move the activation coupling assembly 152 between the first clutch position and the second clutch position, as described above.

In the example of FIG. 3, the actuator 154 is secured to the first thrust ring 172 to selectively rotate it about the drive axis A, while the second thrust ring 176 remains rotationally fixed relative to the drive axis A. In this example, the actuator 154 defines a first linkage (i.e., a telescoping link with pivots at its ends) that joins the first thrust ring 172 to the base first bracket 156a of the base 156. The second thrust ring 176 is mounted to the bracket 156b by a second linkage comprising a pin 156c, and a corresponding bore through the second activation coupling lever 176c, which allows the second thrust ring 176 to slide along the rotation axis A, and thereby move away from the first thrust ring 172.

The example of FIG. 4 is similar to the example of FIG. 3, insofar as the actuator 154 is configured as a telescoping first linkage between the base 156 and the first thrust ring 172, that operates to selectively rotate the first thrust ring 172 about the drive axis A. However, in this case, the second thrust ring 172 is secured to the base 156 by a second linkage in the form of the connecting rod 158, which has a first pivot 158a connected to the base 156, and a second pivot 158b connected to the second lever 176c. The pivots 158a, 158b are configured to allow the second thrust ring 176 to move along the drive axis A, as the first thrust ring 172 is rotated, to thereby move into the second clutch position. For example, the pivots 158a, 158b may comprise spherical rod end or the like, which provide pivoting about all axes through a limited range of motion. In this configuration, the connecting rod 158 has a fixed length while in use, which will cause the second thrust ring 176 to rotate slightly as the second thrust ring moves along the drive axis A (note that the length of the connecting rod 158 may be adjustable for setup or service). The amount and direction of rotation can be controlled by selecting the locations of the first and second pivots 158a, 158b. In the shown example, the first and second thrust rings 172, 176 rotate in the same direction about the drive axis A, with the second thrust ring 176 rotating by a small amount compared to the first thrust ring 172. This embodiment is expected to provide improved durability and simplicity as compared to the example of FIG. 3, because it avoids possible issues caused by high friction loads that may be generated by rotation forces on the pin 156c, but the embodiment of FIG. 3 (or other configurations) can still be favored in some circumstances.

It will be appreciated that other arrangements and features may be provided to operate the activation coupling assembly 152. For example, the actuator 154 may be connected to the second thrust ring 176, rather than the first thrust ring 172. As another example, each thrust ring 172, 176 may have its own actuator. As another example, a single actuator may operate on both thrust rings 172, 176. The type of actuator 154 can also be changed. A hydraulic piston and cylinder may be preferred for simplicity and ease of integration into other operating systems of the baler 100, but electrically-operated actuators or other types may be used. Also, the levers 172c, 176c may be replaced by gears, pulleys, or the like. For example, the actuator may comprise an electric motor that rotates a drive pinion that engages a driven gear formed on the outer surface of the first thrust ring 172. Other alternatives and embodiments will be apparent to persons of ordinary skill in the art in view of the present disclosure.

The actuator 154 may be operated by any suitable control system or user input, to achieve various different operating effects. It may be desirable in some cases to disconnect drive to the baler's operating components for various reasons. For example, in certain crops and conditions it is desirable to shut down the rotating components of the baler before the bale is ejected to prevent damage to the bale net or other wrapping material. It can also be desirable to shut down the rotating components to avoid wear and tear when they are not required to operate, such as during road travel the like. In other cases, it may be desirable to prevent the clutch 144 from moving to the disengaged position. For example, in some conditions, the crop may not be likely to be damaged while continuing to operate the baler components when the tailgate is opened, and in this case it can be desirable to keep the clutch 144 in the engaged position when the tailgate is opened to prevent wear on the actuator 154 and other parts.

To achieve these and other ends, the actuator 154 can be operated by any suitable control system. In one example the control system may be configured to automatically operate the actuator 154 to disengage the clutch 144 under certain predefined conditions, such as when the baler tailgate is opened, but the control system may include a manual override to keep the clutch 144 engaged even when the baler tailgate is opened. In another example, the control system may be configured to always maintain the clutch 144 in the engaged position, unless a manual override is operated to disengage the clutch 144. Combinations of the foregoing embodiments also may be used (e.g., automatically disengage or maintain the engagement of the clutch 144 depending on some operating conditions, with manual overrides to counter the automatic function. Other alternatives and embodiments will be apparent to persons of ordinary skill in the art in view of the present disclosure.

In the shown example, the actuator 154 comprises an expandable hydraulic piston and cylinder assembly, which is connected to a source of pressurized fluid 188 (e.g., a hydraulic pump) by a hydraulic line 190. The source of pressurized fluid 188 may be provided on the baler 100, or on the agricultural vehicle 102. In the latter case, the hydraulic line 190 can be connectable to the source of pressurized fluid by way of a dry-break fitting provided at the hitch 114, or by other conventional means.

A first valve 192 is provided in the hydraulic line 190 to selectively control the operation of the actuator 154 by alternately suppling pressurized fluid to extend the actuator 154 or venting fluid to retract the actuator 154. The first valve 192 may be manually operated, or operated automatically via a control system (not shown). For example, the valve may be operated manually, or by an automatically controlled solenoid, to disengage the clutch 144 whenever the baler tailgate is opened to release a wrapped bale, and re-engage the clutch 144 when the tailgate is closed. The first valve 192, or a separate second valve 194, also may be provided to hold the actuator 154 in the extended or contracted position, so as to hold the clutch in the disengaged or engaged position regardless of the position of the first valve 192, to thereby provide the ability to bypass the normal or automated operation of the clutch 144. In one example, the first valve 192 is provided on the agricultural vehicle 102, and the second valve 194 is provided on the baler 100. This allows remote control of the actuator 154 by an operator or control system located on the vehicle 102 to, for example, override an automatic system that would otherwise engage or disengage the clutch 144, provide the ability to hold the clutch 144 in the disengaged position while the baler 100 is disconnected from the vehicle 102, and so on.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A baler declutch mechanism comprising:
   an input shaft extending in a distal direction along a drive axis from a first input shaft end to second input shaft end;
   a first drive coupling connected to the input shaft at the second input shaft end, and configured to rotate in unison with the input shaft about the drive axis, the first drive coupling comprising a first drive coupling face oriented in the distal direction;
   an output shaft extending in the distal direction along the drive axis from a first output shaft end to a second output shaft end, wherein the output shaft is collinear with the input shaft;
   a second drive coupling connected to the output shaft at the first output shaft end, and configured to rotate in unison with the output shaft about the drive axis, the second drive coupling comprising a second drive coupling face oriented in a proximal direction opposite the distal direction, wherein the second drive coupling is movable along the drive axis between an engaged position in which the second drive coupling face engages the first drive coupling face to cause the second drive coupling to rotate in unison with the first drive coupling about the drive axis, and a disengaged position in which the second drive coupling face is spaced along the drive axis from the first drive coupling face such that the second drive coupling is not caused to rotate in unison with the first drive coupling about the drive axis;
   a first activation coupling located at a fixed first distance along the drive axis from the first drive coupling, with the second drive coupling located between the first drive coupling and the first activation coupling;
   a second activation coupling connected to the second drive coupling and spaced along the drive axis from the second drive coupling, with the first activation coupling located between the second drive coupling and the second activation coupling; and
   an actuator configured to generate a disengagement force along the drive axis to move the second activation coupling along the drive axis away from the first activation coupling, to thereby move the second drive coupling from the engaged position to the disengaged position.

2. The baler declutch mechanism of claim 1, wherein the second drive coupling and the second activation coupling are slidably mounted on the output shaft.

3. The baler declutch mechanism of claim 1, further comprising one or more resilient members positioned between the second drive coupling and the first activation coupling and configured to apply a restoring force against the disengagement force, to thereby move the second drive coupling to the engaged position upon termination of the disengagement force.

4. The baler declutch mechanism of claim 1, further comprising a clutch housing surrounding the first drive coupling and the second drive coupling, wherein the clutch housing is supported on the input shaft and on the output shaft to form a rigid beam extending from the first input shaft end to the second output shaft end.

5. The baler declutch mechanism of claim 4, wherein the clutch housing fully encloses the first drive coupling and the second drive coupling.

6. The baler declutch mechanism of claim 1, wherein:
the first activation coupling comprises:
    a first thrust plate connected to the output shaft between the first output shaft end and the second output shaft end, and configured to rotate in unison with the output shaft about the drive axis; and
    a first thrust ring supported on the first thrust plate to rotate relative to the first thrust plate about the drive axis, the first thrust ring having a first thrust ring proximal face in force-transmitting connection with the first thrust plate, and a first thrust ring distal face oriented in the distal direction;
the second activation coupling comprises:
    a second thrust plate connected to the output shaft between the first activation coupling and the second output shaft end, and configured to rotate in unison with the output shaft about the drive axis, and
    a second thrust ring supported on the second thrust plate to rotate relative to the second thrust plate about the drive axis, the second thrust ring having a second thrust ring proximal face oriented in the proximal direction and in force-transmitting connection with the first thrust ring distal face, and a second thrust ring distal face in force-transmitting connection with the second thrust plate; and
the actuator is configured to apply the disengagement force between the first thrust ring distal face and the second thrust ring proximal face.

7. The baler declutch mechanism of claim 6, wherein:
the first thrust ring distal face comprises a first cam profile;
the second thrust ring proximal face comprises a second cam profile; and
the first cam profile and the second cam profile are shaped to generate the disengagement force upon rotation of the first thrust ring relative to the second thrust ring about the drive axis.

8. The baler declutch mechanism of claim 7, wherein:
the first cam profile comprises a plurality of first protrusions extending in the distal direction, with respective first gaps between each adjacent pair of first protrusions; and the second cam profile comprises a plurality of second protrusions extending in the proximal direction, with respective second gaps between each adjacent pair of second protrusions;
wherein the first thrust ring is rotatable relative to the second thrust ring about the drive axis between:
    a first clutch position, corresponding to the engaged position of the second drive coupling, in which the plurality of first protrusions are positioned within the respective second gaps between each adjacent pair of second protrusions, and the plurality of second protrusions are positioned within the respective first gaps between each adjacent pair of first protrusions, and
    a second clutch position, corresponding to the disengaged position of the second drive coupling, in which the plurality of first protrusions are aligned along the drive axis with the plurality of second protrusions.

9. The baler declutch mechanism of claim 8, wherein the actuator comprises:
a base;
a first linkage secured between the base and the first thrust ring;
a second linkage secured between the base and the second thrust ring;
a drive member configured to move at least one of the first linkage and the second linkage to rotate the first thrust ring and the second thrust ring between the first clutch position and the second clutch position.

10. The baler declutch mechanism of claim 9, wherein the drive member comprises a hydraulic piston and cylinder arrangement integrated into one of the first linkage and the second linkage.

11. The baler declutch mechanism of claim 8, wherein the actuator comprises:
a base;
a drive member secured between the base and the first thrust ring, and operable to selectively rotate the first thrust ring relative to the second thrust ring between the first clutch position and the second clutch position; and
a second linkage having a first connector secured to the base, a second connector secured to the second thrust ring, and a fixed-length link joining the first connector to the second connector, wherein the second linkage is configured to allow the second thrust ring to move in the distal direction.

12. The baler declutch mechanism of claim 1, wherein:
the first drive coupling face comprises one or more first drive protrusions extending in the distal direction towards the second drive coupling; and
the second drive coupling face comprises one or more second drive protrusions extending in the proximal direction towards the first drive coupling;
wherein:
    the one or more first drive protrusions engage the one or more second drive protrusions when the second drive coupling is in the engaged position to thereby transmit a rotational force from the first drive coupling to the second drive coupling, and
    the one or more first drive protrusions do not engage the one or more second drive protrusions when the second drive coupling is in the engaged position to thereby not transmit a rotational force from the first drive coupling to the second drive coupling.

13. The baler declutch mechanism of claim 12, wherein the second activation coupling is connected to the second drive coupling by one or more lost motion tensile connectors configured to allow the second drive coupling to move towards the second activation coupling by a fixed distance.

14. The baler declutch mechanism of claim 13, wherein:
the engaged position comprises a predetermined range of motion of the second drive coupling relative to the first drive coupling along the drive axis; and
the fixed distance is greater than the predetermined range of motion.

15. The baler declutch mechanism of claim 14, further comprising one or more resilient members configured to bias the second drive coupling away from the second activation coupling.

16. The baler declutch mechanism of claim 15, wherein the one or more lost motion tensile connectors comprise:
at least one connecting rod extending from a proximal rod end to a distal rod end, wherein the proximal rod end is fixedly secured to the second drive coupling to cause the at least one connecting rod to move in unison with the second drive coupling along the drive axis, and the distal rod end is located between the second activation coupling and the second output shaft end;
a rod retainer fixed to the connecting rod between the distal rod end and the second activation coupling, and configured to prevent the second activation coupling from moving in the distal direction beyond the rod retainer.

17. An agricultural baler comprising:
a frame;
one or more wheels attached to the frame and configured to guide the frame along a travel direction;
a gearbox attached to the frame;
one or more baler drive components configured to process crop material into bales; and
a baler declutch mechanism according to claim 1 having the first input shaft end operatively connected to the gearbox and the second output shaft end operatively connected to the one or more baler drive components.

18. The agricultural baler of claim 17, wherein the actuator comprises a hydraulic piston and cylinder assembly, and the agricultural baler further comprises
a hydraulic line connected at a first end to the hydraulic piston and cylinder assembly and being connectable at a second end to a source of pressurized hydraulic fluid; and
a valve located in the hydraulic line to selectively close the hydraulic line.

19. The agricultural baler of claim 18, wherein the valve is operable to hold the hydraulic piston and cylinder assembly with the drive coupling in the engaged position.

20. The agricultural baler of claim 17, wherein the input shaft and output shaft are configured as a jackshaft extending from the gearbox to the one or more baler drive components.

* * * * *